US009722230B2

(12) United States Patent
Fujiwara et al.

(10) Patent No.: US 9,722,230 B2
(45) Date of Patent: Aug. 1, 2017

(54) BATTERY PACK AND VEHICLE PROVIDED WITH SAME

(71) Applicants: Nobuyoshi Fujiwara, Toyota (JP); Kosuke Kusaba, Inazawa (JP); Katsunori Sato, Toyota (JP)

(72) Inventors: Nobuyoshi Fujiwara, Toyota (JP); Kosuke Kusaba, Inazawa (JP); Katsunori Sato, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 447 days.

(21) Appl. No.: 14/085,105

(22) Filed: Nov. 20, 2013

(65) Prior Publication Data

US 2014/0154530 A1 Jun. 5, 2014

(30) Foreign Application Priority Data

Nov. 30, 2012 (JP) ................. 2012-263619

(51) Int. Cl.
*H01M 2/20* (2006.01)
*H01M 2/34* (2006.01)
*H01M 10/04* (2006.01)
*H01M 2/10* (2006.01)
*H01M 2/12* (2006.01)

(52) U.S. Cl.
CPC ......... *H01M 2/206* (2013.01); *H01M 2/1077* (2013.01); *H01M 2/1229* (2013.01); *H01M 2/34* (2013.01); *H01M 2/1083* (2013.01); *H01M 2/12* (2013.01); *H01M 10/0422* (2013.01); *H01M 2200/103* (2013.01)

(58) Field of Classification Search
CPC .... H01M 10/0422; H01M 2/206; H01M 2/12; H01M 2/1077; H01M 2/34; H01M 2/1229; H01M 2/1083; H01M 2200/103
USPC .......................................... 429/7
See application file for complete search history.

(56) References Cited

U.S. PATENT DOCUMENTS 6,211,646 B1* 4/2001 Kouzu ............... H01M 10/613
320/107
2006/0028170 A1* 2/2006 Izawa ............... H01M 2/1033
320/107

(Continued)

FOREIGN PATENT DOCUMENTS

WO 2008/121224 A1 10/2008

*Primary Examiner* — Jonathan Jelsma
*Assistant Examiner* — Omar Kekia
(74) *Attorney, Agent, or Firm* — Sughrue Mion, PLLC

(57) ABSTRACT

A battery pack includes a single cell having a cylindrical shape, the single cell having a positive electrode at one end of the single cell and a negative electrode at the other end of the single cell, a plurality of the single cells being arranged in a radial direction of the single cell; a fuse; a first bus bar connected via the fuse to one electrode, from among the positive electrode and the negative electrode; a second bus bar directly connected to the other electrode, from among the positive electrode and the negative electrode; and a retaining member configured to retain the plurality of single cells from the radial direction of the single cell, in a manner such that when the fuse is disconnected, retaining force with which the single cell is retained by the retaining member decreases and the single cell moves in a direction away from the fuse.

8 Claims, 6 Drawing Sheets

(56) References Cited

U.S. PATENT DOCUMENTS

2006/0177734 A1* 8/2006 Yao .................... H01M 2/1077
429/160
2011/0151315 A1* 6/2011 Masson ............... H01M 2/1077
429/159

* cited by examiner

BATTERY PACK AND VEHICLE PROVIDED WITH SAME

INCORPORATION BY REFERENCE

The disclosure of Japanese Patent Application No. 2012-263619 filed on Nov. 30, 2012 including the specification, drawings and abstract is incorporated herein by reference in its entirety.

BACKGROUND OF THE INVENTION

1. Field of the Invention

The invention relates to a battery pack having a plurality of cylindrical single cells, and a vehicle provided with this battery pack.

2. Description of Related Art

A type of battery pack that stores operating power to be supplied to a motor for running a vehicle is mounted in vehicles such as hybrid vehicles and electric vehicles and the like. This type of battery pack is described in International Publication No. WO 2008/121224, which describes a battery pack that has a plurality of single cells, a flat bus bar for electrically connecting these single cells together, and fuses that connect electrodes of the single cells to the bus bar.

However, with the structure described in International Publication No. WO 2008/121224, when one of the fuses becomes disconnected due to a battery abnormality, a fixing part that fixes the single cell is subjected to heat from the single cell that generates heat, and consequently the fixing part thermally melts. With this, the disconnected fuse may become reconnected to the electrode when the vehicle vibrates or the like.

SUMMARY OF THE INVENTION

The invention thus provides a battery pack that inhibits a disconnected fuse from being reconnected, as well as a vehicle provided with this battery pack.

(1) A first aspect of the invention relates to a battery pack that includes a single cell having a cylindrical shape, the single cell having a positive electrode at one end of the single cell and a negative electrode at the other end of the single cell, and a plurality of the single cells being arranged in a radial direction of the single cell; a fuse; a first bus bar connected via the fuse to one electrode, from among the positive electrode and the negative electrode; a second bus bar directly connected to the other electrode, from among the positive electrode and the negative electrode; and a retaining member configured to retain the plurality of single cells from the radial direction of the single cell, in a manner such that when the fuse is disconnected, retaining force with which the single cell is retained by the retaining member decreases and the single cell moves in a direction away from the fuse.

(2) In the structure of (1) described above, the single cell may be arranged with the one electrode facing upward and the other electrode facing downward, and when the retaining force decreases, the single cell may move in the direction away from the fuse by falling due to gravitational force. According to the structure of (2), independent driving means for moving the single cell away from the fuse becomes unnecessary. Therefore, the structure is able to be simplified and the cost is able to be reduced.

(3) In the structure of (2) described above, the retaining member may have a retaining surface that retains the single cell, the retaining surface may be made of resin, and when the fuse is disconnected, the retaining surface may thermally melt or crack such that the retaining force decreases. According to the structure of (3), the retaining force with respect to the single cell is able to be reduced by transferring heat from the single cell that has generated heat when the fuse disconnected, to the retaining surface.

(4) In the structure of (2) or (3) described above, a gas release valve may be provided on the other electrode-side of the single cell, and the gas release valve may be configured to release gas that is inside the single cell. According to the structure of (4), the gas release valve is formed on the electrode that is on the side where the fuse is not provided, so disconnection of the fuse due to gas being released from the gas release valve is able to be inhibited.

(5) In the structure of (1) above, the second bus bar may elastically deform and apply tension to the single cell such that the tension pulls the single cell in the direction away from the fuse. According to the structure of (5), the single cell moves in a direction away from the fuse by the elastic force of the second bus bar. Therefore, independent driving means for moving the single cell away from the fuse becomes unnecessary, so the structure is able to be simplified and the cost is able to be lower.

(6) In the structure of (5) above, a gas release valve configured to release gas that is inside the single cell may be provided on the positive electrode-side of the single cell, the one electrode may be the negative electrode, and the other electrode may be the positive electrode. According to the structure of (6), the gas release valve is formed on the electrode on the side where the fuse is not provided, so disconnection of the fuse due to gas released from the gas release valve is able to be inhibited.

(7) In the structures of (1) to (6) described above, the plurality of single cells may be connected together in parallel.

According to the first aspect described above, reconnection of a disconnected fuse is able to be inhibited.

A second aspect of the invention relates to a vehicle that includes a battery pack including, a single cell having a cylindrical shape, the single cell having a positive electrode at one end of the single cell and a negative electrode at the other end of the single cell, and a plurality of the single cells being arranged in a radial direction of the single cell, a fuse, a first bus bar connected via the fuse to one electrode, from among the positive electrode and the negative electrode, a second bus bar directly connected to the other electrode, from among the positive electrode and the negative electrode, and a retaining member configured to retain the plurality of single cells from the radial direction of the single cell, in a manner such that when the fuse is disconnected, retaining force with which the single cell is retained by the retaining member decreases and the single cell moves in a direction away from the fuse; and a motor configured to travel a vehicle, the motor being driven using electric power stored in the battery pack.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
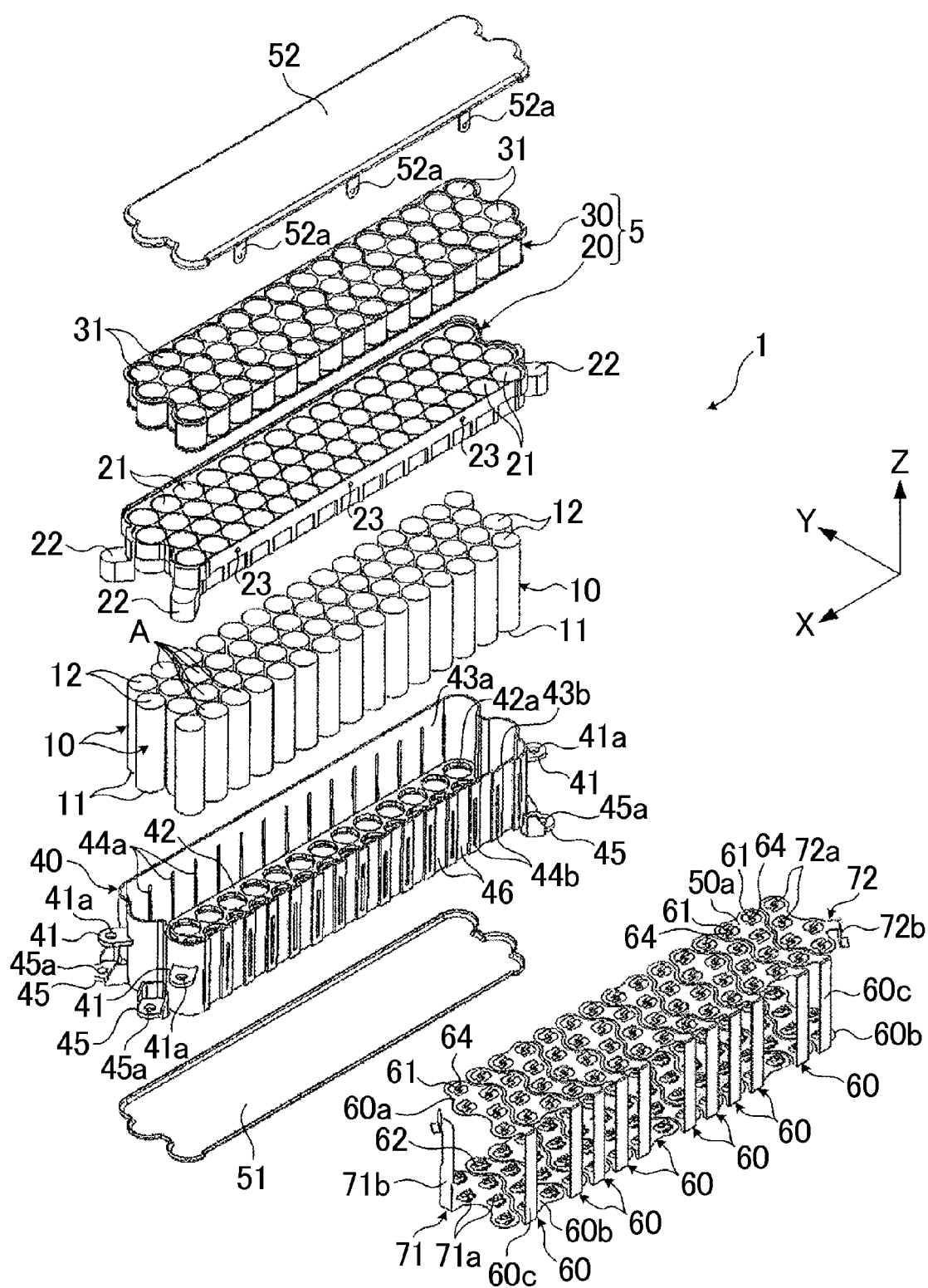
FIG. 1 is an exploded perspective view of a battery pack according to a first example embodiment of the invention.
Figure 2:
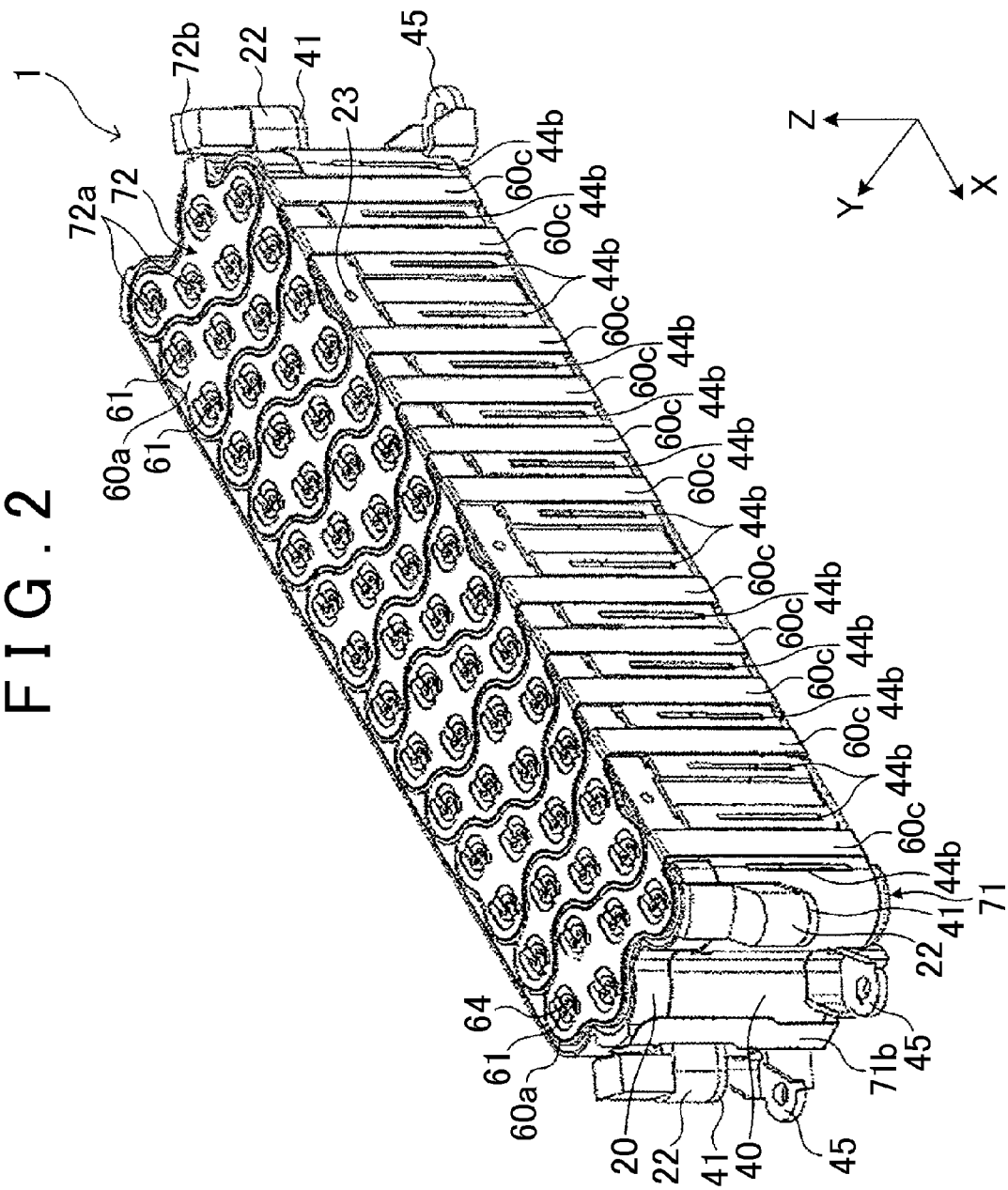
FIG. 2 is an external perspective view of the battery pack.
Figure 3:
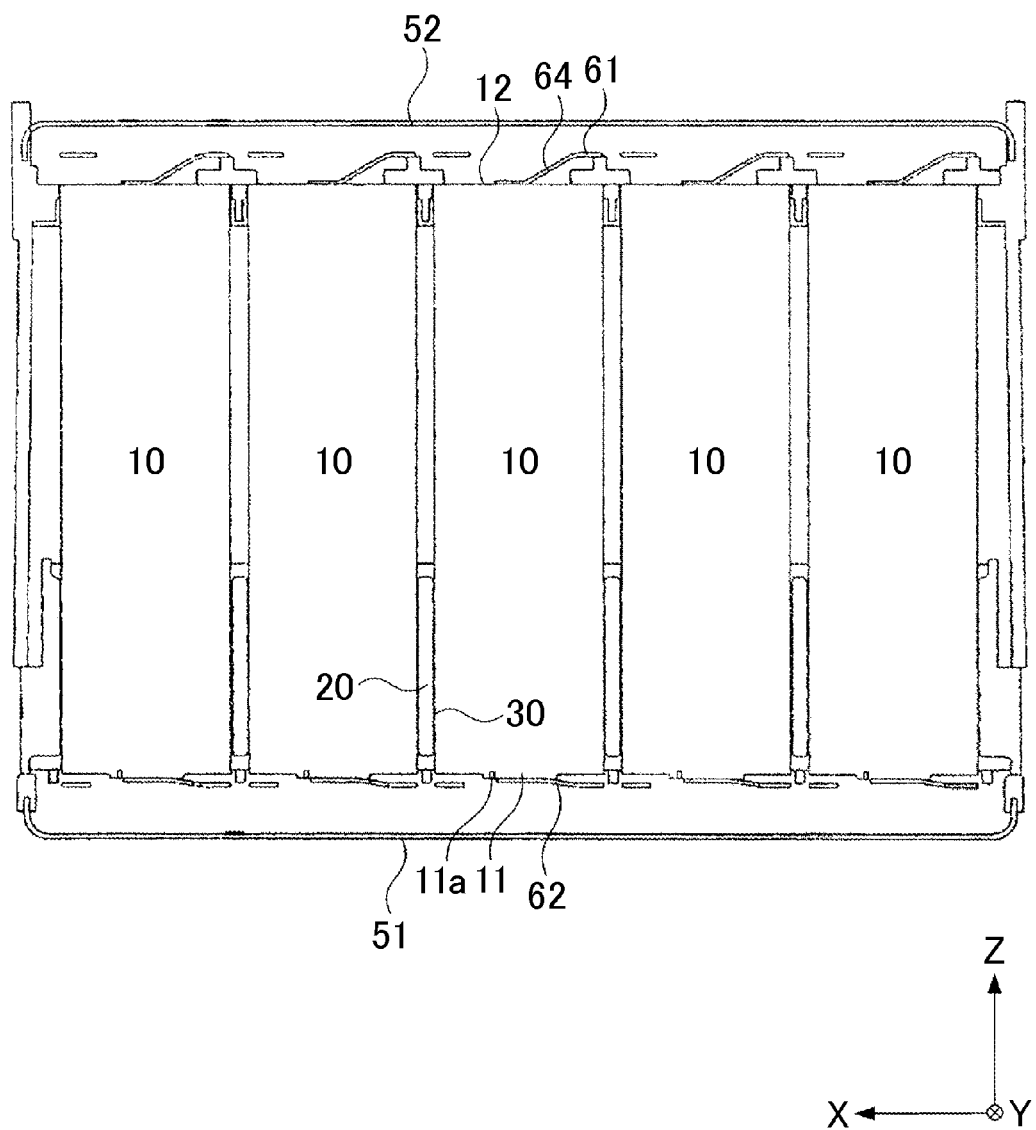
FIG. 3 is a sectional view schematically showing the battery pack.

A battery pack according to a first example embodiment of the invention will now be described with reference to the accompanying drawings. FIG. 1 is an exploded view of the battery pack. FIG. 2 is an external perspective view of the battery pack, and FIG. 3 is a sectional view of the battery pack shown cut along an X-Z plane. To simplify the drawing, single cells 10 are shown reduced in number. An X axis, a Y axis, and a Z axis are three axes that are orthogonal to each other. In the description below, the X axis direction is defined as a +X axis direction, the direction opposite the X axis direction is defined as a −X axis direction, the Y axis direction is defined as a +Y axis direction, the direction opposite the Y axis direction is defined as a −Y axis direction, the Z axis direction is defined as a +Z axis direction, and the direction opposite the Z axis direction is defined as a −Z axis direction. However, when there is no particular need to differentiate between the +X axis direction and the −X axis direction, these will collectively be referred to as the "X axis direction". When there is no particular need to differentiate between the +Y axis direction and the −Y axis direction, these will collectively be referred to as the "Y axis direction". When there is no particular need to differentiate between the +Z axis direction and the −Z axis direction, these will collectively be referred to as the "Z axis direction".

A battery pack 1 includes a plurality of single cells 10. The single cells 10 are cylindrical type batteries in which a power generating element is housed inside of a battery case formed in a cylindrical shape. Secondary batteries such as nickel-metal hydride batteries or lithium-ion batteries may be used for the single cells 10. Also, electric double layer capacitors may be used for the single cells 10.

All of the single cells 10 that form the battery pack 1 are arranged with negative terminals 12 positioned upward, as shown in FIG. 1. That is, the negative terminals 12 of all of the single cells 10 are arranged lined up in the same plane (in an X-Y plane). In other words, positive terminals 11 of all of the single cells 10 are arranged lined up in the same plane (i.e., in the X-Y plane). The single cells 10 will be described in detail later. In the following description, the single cells and the like that are provided in plurality may be referred to in the singular to facilitate understanding.

The single cells 10 are retained by a retaining member 5. This retaining member 5 includes a holder 20 and an insulating body 30 that corresponds to a retaining surface. The holder 20 has open portions 21 into which the single cells 10 are inserted. The open portions 21 are formed in shapes (more specifically, cylindrical shapes) following the outer peripheral surface of the single cells 10, and are provided in the same number as there are single cells 10. However, the number of open portions 21 of the holder 20 that are provided does not necessarily have to match the number of single cells 10. For example, when retaining a group of cells in which the plurality of single cells 10 are connected in series in the Z axis direction, this group of cells may be retained by a single open portion 21. Also, when some of the open portions 21 are open portions that do not retain single cells 10, this portion of open portions may be used as space for inserting a bus bar (a conductive member). Furthermore, open portions that retain single cells 10 that are adjacent in the radial direction may be connected to form a single open portion 21.

Forming the holder 20 of material having good thermal conductivity such as aluminum or the like, for example, facilitates the transfer of heat generated by the single cells 10 due to charging or discharging or the like, to the holder 20. Having the heat of the single cells 10 escape to the holder 20 enables a variation in temperature among the single cells 10 to be suppressed.

The insulating body 30 is arranged between the open portions 21 of the holder 20 and the single cells 10. The insulating body 30 is formed by insulating material such as resin, and insulates the single cells 10 from the holder 20. Open portions 31 into which the single cells 10 are inserted are formed in the insulating body 30. The open portions 31 are provided in the same number as there are single cells 10.

The insulating body 30 is formed with adhesive such as thermosetting resin material or material capable of elastically deforming such as resin used in injection molding, or the like. The insulating body 30 is elastically deformed so that it closely contacts the outer peripheral surface of the single cells 10 and the open portions 21 of the holder 20. Alternatively, the space between the single cells 10 and the holder 20 may be filled with resin and adhered by this resin. In this way, the single cells 10 are fixed to the holder 20 by elastically deforming the insulating body 30 or adhering the insulating body 30 to the holder 20. The insulating body 30 may be formed by inserting the single cells 10 into the open portions 21 of the holder 20, and then filling material that will form the insulating body 30 between the single cells 10 and the open portions 21, for example.

Here, when the insulating body 30 is formed of resin such as that used in injection molding, the insulating body 30 will thermally melt if a retained single cell 10 becomes overheated, which will reduce the retaining force with which the single cell 10 is retained. That is, when there is an abnormality in the battery such that a fuse 64, to be described later, becomes disconnected, the insulating body 30 will be subjected to the heat of the single cell 10 and thermally melt, which reduces the retaining force with which the single cell 10 is retained. When the insulating body 30 is formed with adhesive such as a thermosetting resin, the insulating body 30 will thermally melt if the retained single cell 10 becomes overheated, which will reduce the retaining force with which the single cell 10 is retained. That is, when there is an abnormality in the battery such that the fuse 64, to be described later, becomes disconnected, the insulating body 30 will be subjected to the heat of the single cell 10 and thermally melt, which reduces the retaining force with which the single cell 10 is retained.

The holder 20 is fixed to a module case 40. An open portion into which the plurality of single cells 10 are fit is formed in an upper portion of the module case 40, and the upper portion of the module case 40 is closed off by the holder 20. A plurality of flanges 22 are provided on an outer edge of the holder 20. Here, the number of flanges 22 may be set as appropriate. A plurality of flanges 41 that support the flanges 22 are provided on the module case 40. The flanges 41 are provided in positions corresponding to the flanges 22 of the holder 20.

The holder 20 is able to be positioned with respect to the module case 40 by attaching the flanges 22 to the flanges 41.

More specifically, the holder 20 is positioned in the X-Y plane with respect to the module case 40, by a portion of the flanges 22 contacting an outer wall surface of the module case 40.

A hole 41a is formed in each flange 41, and a bolt, not shown, is inserted into the hole 41a. Also, a thread groove, not shown, into which the bolt is inserted is formed in the flanges 22. The holder 20 is able to be fixed to the module case 40 by the bolts being inserted into the holes 41a and the thread grooves of the flanges 22. That is, the holder 20 is able to be prevented from moving in the Z axis direction with respect to the module case 40.

The module case 40 surrounds the plurality of single cells 10 in the X-Y plane, such that the plurality of single cells 10 are housed inside the module case 40. A plurality of open portions 42a are formed in a bottom surface 42 of the module case 40. The open portions 42a are provided in the same number as the number of single cells 10. The single cells 10 are able to be positioned with respect to the module case 40 by inserting the single cells 10 into the open portions 42a.

That is, a region on the positive terminal 11 side of the single cell 10 is positioned in the X-Y plane by the open portion 42a of the module case 40. On the other hand, a region on the negative terminal 12 side of the single cell 10 is positioned in the X-Y plane by the open portion 21 of the holder 20. In this way, in this example embodiment, both ends in the length direction of the single cells 10 that is the Z axis direction are positioned by the module case 40 and the holder 20, respectively, such that two single cells 10 that are adjacent in the X-Y plane are prevented from contacting one another.

The module case 40 may be made of insulating material such as resin. As a result, two single cells 10 that are adjacent in the X-Y plane are able to be insulated. Two single cells 10 that are adjacent in the X-Y plane may also be insulated by covering the outer surface of the single cells 10 with a layer formed by insulating material. On the other hand, the module case 40 may also be made of conductive material. In this case, a layer formed by insulating material may be formed on a surface of the module case 40 that faces the single cells 10. As a result, the single cells 10 are able to be insulated from the module case 40.

The module case 40 has side walls 43a and 43b that oppose each other in the Y axis direction. A plurality of slits 44a arranged lined up in the X axis direction are formed in the side wall 43a. The slits 44a extend in the Z axis direction and are formed by rectangular open portions.

The slits 44a are used to take a heat exchange medium used to regulate the temperature of the single cells 10 into the module case 40, as will be described later. More specifically, a chamber, not shown, that extends in the X axis direction is attached to the side wall 43a. By supplying the heat exchange medium to the chamber, the heat exchange medium supplied to the chamber is able to be taken into the module case 40 through the slits 44a.

A plurality of slits 44b arranged lined up in the X axis direction are formed in the side wall 43b of the module case 40. The slits 44b extend in the Z axis direction and are formed by rectangular open portions. The slits 44b are used to discharge the heat exchange medium in the module case 40 outside of the module case 40, as will be described later. More specifically, a chamber, not shown, that extends in the X axis direction is attached to the side wall 43b. The heat exchange medium that has passed through the slits 44b is moved into the chamber, and the heat exchange medium can then be discharged from this chamber.

The heat exchange medium for cooling can be supplied into the module case 40 when the single cells 10 generate heat by charging or discharging or the like. As a result, an increase in the temperature of the single cells 10 is able to be suppressed. That is, by performing heat exchange between the heat exchange medium and the single cells 10, the heat from the single cells 10 is transferred to the heat exchange medium, so an increase in the temperature of the single cells 10 can be suppressed. Air or the like may be used as the heat exchange medium. When cooling the single cells 10, a heat exchange medium, the temperature of which has been regulated to a temperature lower than the temperature of the single cells 10, may be used.

Meanwhile, when the single cells 10 are affected by the external environment or the like and cooled excessively, a heated heat exchange medium may be supplied into the module case 40. As a result, the temperature of the single cells 10 is able to be inhibited from decreasing. That is, by performing heat exchange between the heat exchange medium and the single cells 10, the heat from the heat exchange medium is transferred to the single cells 10, such that the temperature of the single cells 10 is able to be inhibited from decreasing. Air or the like may be used as the heat exchange medium. When heating the single cells 10, a heat exchange medium, the temperature of which has been regulated to a temperature higher than the temperature of the single cells 10, may be used.

A plurality of brackets 45 are provided on a lower portion of the module case 40. Each of the brackets 45 has an open portion 45a, and a bolt, not shown, is inserted into this open portion 45a. The brackets 45 are used when mounting the battery pack 1 of this example embodiment to a specific device. That is, the battery pack 1 may be mounted to a specific device using the bolts inserted into the brackets 45. The battery pack 1 may be mounted to a vehicle, for example. In this case, the battery pack 1 may be fixed to a vehicle body using the brackets 45.

When mounting the battery pack 1 to a vehicle, electric energy output from the battery pack 1 can be converted to kinetic energy using a motor-generator. The vehicle can then be driven by transferring this kinetic energy to the wheels. Also, kinetic energy generated when braking the vehicle can be converted into electrical energy using a motor-generator. This electric energy is able to be stored in the battery pack 1 as regenerative power.

A negative electrode cover 52 is arranged on an upper surface of the holder 20. The negative electrode cover 52 is not shown in FIG. 2. The negative electrode cover 52 has arm portions 52a that extend in the Z axis direction. An open portion is formed in a tip end of each arm portion 52a. Pins 23 are provided on an outside edge of the holder 20. These pins 23 are inserted into the open portions of the arm portions 52a. As a result, the negative electrode cover 52 is able to be fixed to the holder 20.

A space is formed between a positive electrode cover 51 and the module case 40. This space may be used as an exhaust gas path. Here, a gas release valve 11a is formed in each of the positive terminals 11 of the single cells 10 shown in FIG. 3. When the internal pressure of a single cell 10 reaches a working pressure, the gas release valve 11a changes from closed to open, thus releasing the gas inside the single cell 10. The gas released from the gas release valve 11a passes through the exhaust gas path and is discharged out of the battery pack 1. Bus bars 60 and 71 that will be described later are arranged between the negative electrode cover 52 and the bottom surface 42 of the module case 40. Therefore, the negative electrode cover 52 is used to protect the bus bars 60 and 71.

However, the gas release valve 11a may also be provided in each of the negative terminals 12. In this case, an exhaust gas path is formed in a space provided between the negative electrode cover 52 and the holder 20. Here, when the positive terminals 11 of the plurality of single cells 10 are arranged on the upper surface and lower surface of the battery pack 1, gas ends up being discharged from both the upper surface and the lower surface of the battery pack 1. In this case, an exhaust gas path must be provided in both the upper surface and the lower surface of the battery pack 1, so the exhaust gas path becomes larger. In this example embodiment, an exhaust gas path only needs to be provided on only the upper surface or the lower surface of the battery pack 1, so the exhaust gas path is able to be inhibited from becoming larger.

A fuse 64 is connected to each of the negative terminals 12 of the single cells 10 that protrude from the holder 20 (i.e., the insulating body 30). As shown in FIG. 3, this fuse 64 is connected to a negative electrode tab 61 of the bus bar 60. This negative electrode tab 61 is provided in a position facing the negative terminal 12 in the Z axis direction. The fuse 64 is connected to the negative terminal 12 of the single cell 10 and the fuse 64 by welding or the like. For example, the fuse 64 may be a conducting wire that melts as a result of overcurrent equal to or greater than a predetermined value flowing through it. The current of the single cell 10 connected to the fuse 64 is able to be interrupted by the fuse 64 melting.

In this way, in this example embodiment, the gas release valve 11a is formed on the positive terminal 11 that is an electrode on the side where the fuse 64 is not connected. Therefore, melting of the fuse 64 due to gas released from the gas release valve 11a is able to be prevented.

In this example embodiment, five negative electrode tabs 61 are formed in a first region (corresponding to a first bus bar) 60a of the bus bar 60. This first region 60a is formed in a flat plate shape along the X-Y plane. The first region 60a of the bus bar 60 is arranged between the holder 20 and the positive electrode cover 51.

The number of negative electrode tabs 61 formed in the first region 60a may be set to one or more as appropriate. As will be described later, when the plurality of single cells 10 are electrically connected in parallel, the number of negative electrode tabs 61 formed in the first region 60a is set according to the number of single cells 10 that are electrically connected in parallel. In other words, the number of negative electrode tabs 61 formed in the first region 60a is the same as the number of single cells 10 that are electrically connected in parallel. In this example embodiment, the first region 60a of the plurality of bus bars 60 is formed in a shape according to the position of the corresponding negative electrode tabs 61.

One battery block A is formed by the plurality of single cells 10 that are connected in parallel by one bus bar 60. In this example embodiment, one battery block is formed by five single cells 10.

A positive electrode tab 62 of the bus bars 60 is connected to the positive terminal 11 of each of the single cells 10 that are protruding from the open portions 42a of the module case 40. The positive electrode tab 62 is connected to the positive terminal 11 by welding or the like from the Z axis direction. In this example embodiment, five of the positive electrode tabs 62 are formed in a second region, 60b of the bus bar 60 that corresponds to the second bus bar. The second region 60b is formed in a flat plate shape along the X-Y plane. The second region 60b of the bus bars 60 is arranged between the module case 40 and the negative electrode cover 52, as described above.

The number of positive electrode tabs 62 formed in the second region 60b may be set to one or more as appropriate. As will be described later, when the single cells 10 are electrically connected in parallel, the number of positive electrode tabs 62 formed in the second region 60b is set according to the number of single cells 10 that are electrically connected in parallel. In other words, the number of positive electrode tabs 62 formed in the second region 60b is the same as the number of single cells 10 that are electrically connected in parallel. In this example embodiment, the second region 60b of the plurality of bus bars 60 is formed in a shape according to the position of the corresponding positive electrode tabs 62.

The first region 60a and the second region 60b are connected via a third region 60c that extends in the Z axis direction. In other words, an upper end of the third region 60c is connected to the first region 60a, and a lower end of the third region 60c is connected to the second region 60b. The third region 60c is arranged on the outside of the module case 40. The third region 60c of all of the bus bars 60 is arranged lined up in the X axis direction, and arranged along a side wall 43b of the module case 40. A recessed portion 46 is formed on the outside surface of the side wall 43b, and the third region 60c is housed in this recessed portion 46.

With the battery pack 1 according to this example embodiment, bus bars 71 and 72 are used in addition to the bus bars 60. The bus bars 71 and 72 are provided on both ends (i.e., one on each end) of the battery pack 1 in the X axis direction, and are shaped differently than the bus bars 60.

The bus bar 71 includes a positive electrode tab 71a that is connected to the positive terminals 11. Here, the bus bar 71 is not connected to the negative terminals 12. In this example embodiment, the bus bar 71 is connected to five of the positive terminals 11, so five of the positive electrode tabs 71a are provided. Also, the bus bar 72 includes a negative electrode tab 72a that is connected to the negative terminals 12. Here, the bus bar 72 is not connected to the positive terminals 11. In this example embodiment, the bus bar 72 is connected to five of the negative terminals 12, so five of the negative electrode tabs 72a are provided.

A lead 71b provided on the bus bar 71 is used as a positive terminal of the battery pack 1. Also, a lead 72b provided on the bus bar 72 is used as a negative terminal of the battery pack 1. When the battery pack 1 is electrically connected to a load, the leads 71b and 72b are connected to the load via wires.

Figure 4:
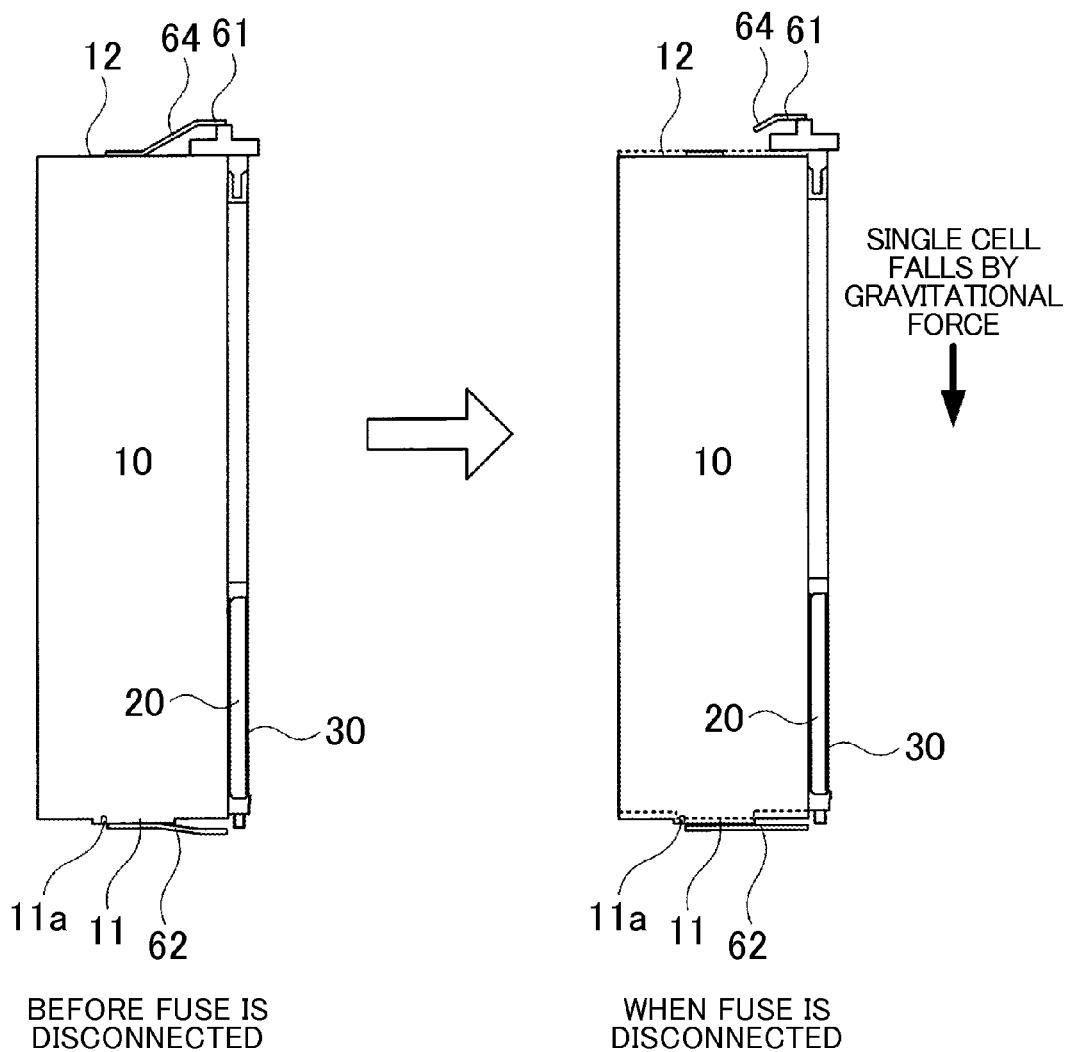
FIG. 4 is an explanatory view of the operation of a single cell when a fuse is disconnected.

Next, the operation of one of the single cells 10 when the fuse 64 is disconnected will be described with reference to FIG. 4. When overcurrent flows through the single cell 10, the fuse 64 melts (i.e., blows). However, the single cell 10 generates heat due to the overcurrent, so the insulating body 30 that retains the single cell 10 that has generated heat thermally melts or cracks. As a result, the retaining force with which the single cell 10 is retained by the insulating body 30 decreases. When the retaining force by the insulating body 30 decreases, the single cell 10 that has generated heat falls under its own weight and separates from the fuse 64.

In this way, the structure of this example embodiment enables the negative terminal 12 of the single cell 10 to separate from the fuse 64 when the fuse 64 is disconnected (i.e., blown). Therefore, the negative terminal 12 is able to be inhibited from electrically reconnecting to the fuse 64. As a result, heat generation by the single cell 10 due to electrical reconnection is suppressed, so heat damage to adjacent single cells 10 is able to be inhibited. Also, when the negative terminal 12 separates from the fuse 64, it does so by falling under its own weight. Therefore, an independent driving member for moving the single cell 10 is able to be omitted, thereby enabling the structure to be simplified and the cost to be lower.

Second Example Embodiment

Figure 5:
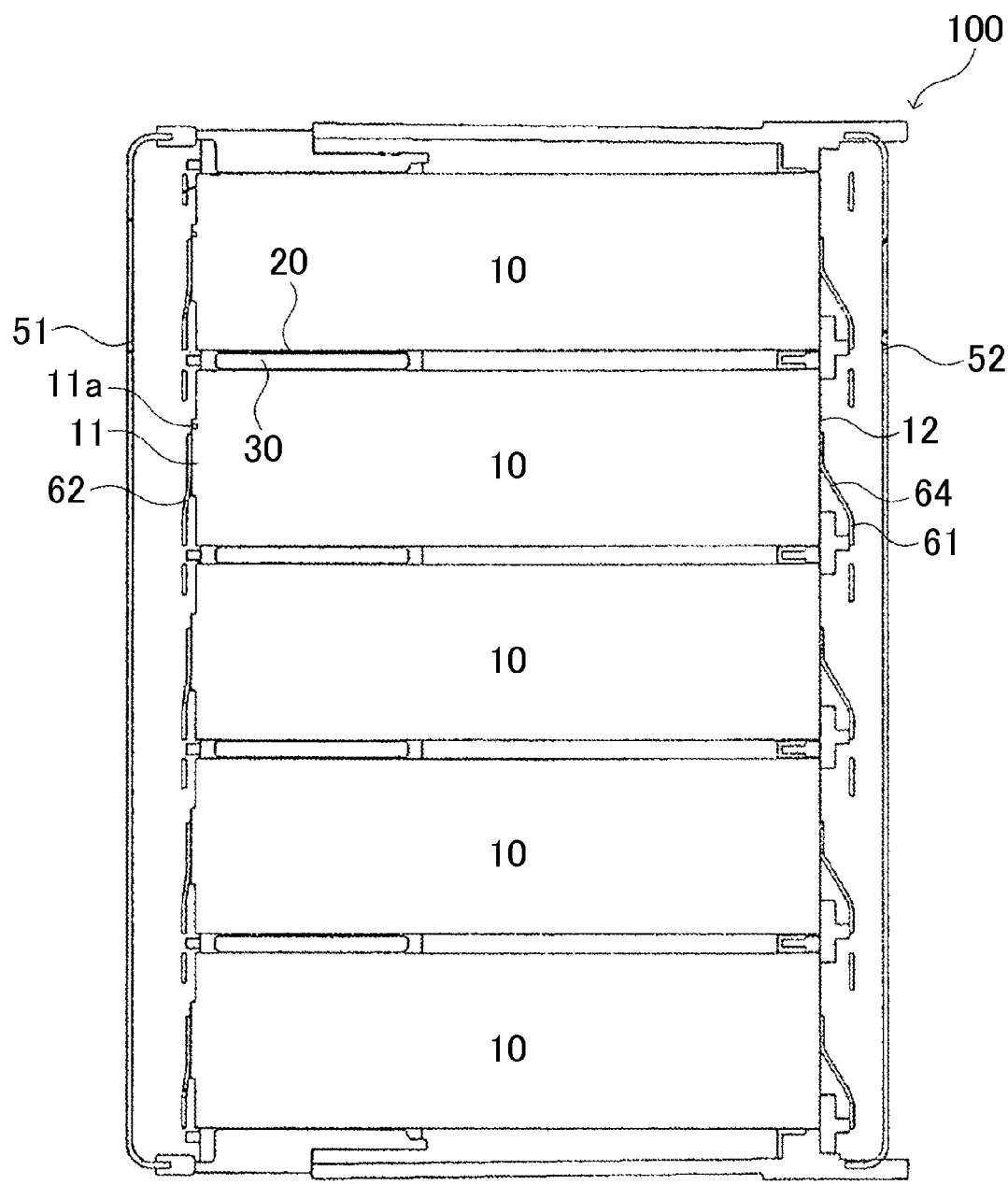
FIG. 5 is a sectional view schematically showing a battery pack according to a second example embodiment of the invention.
Figure 5:
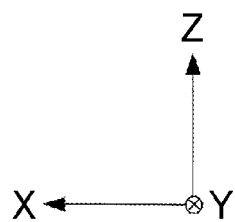
Figure 6:
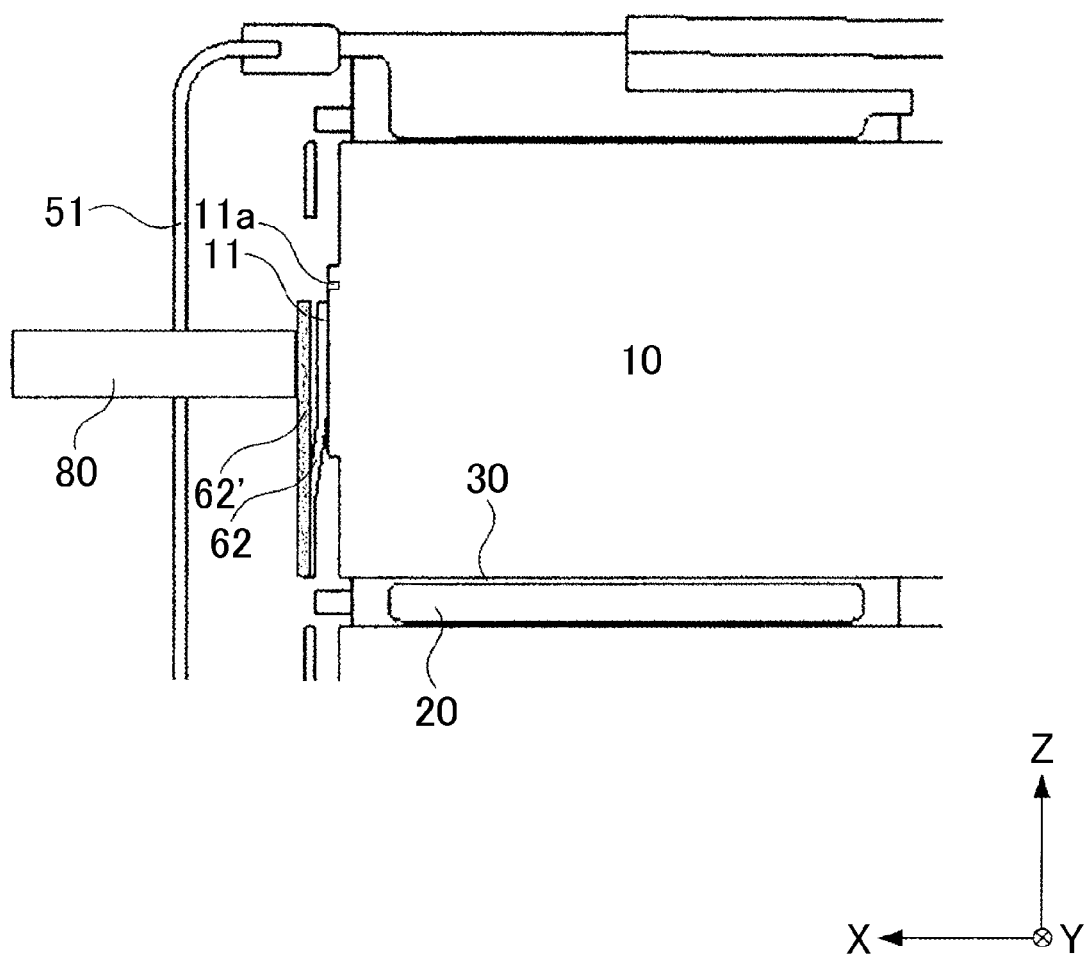
FIG. 6 is a view showing a frame format of a welding method of a positive electrode tab and a positive terminal.

Next, a second example embodiment of the invention will be described. The structure of a battery pack 100 according to this second example embodiment differs from the structure of the battery pack 1 according to the first example embodiment in that the single cells 10 are arranged sideways (i.e., on their sides), and the positive electrode tabs 62 are elastically deformed. The other structure is basically the same as it is in the first example embodiment described above, so a detailed described thereof will be omitted. FIG. 5 is a sectional view of the battery pack that corresponds to FIG. 3. FIG. 6 is a view showing a frame format of a welding method of the positive electrode tab 62.

Referring to FIG. 6, a base material tab 62' that is the base material of the positive electrode tab 62 is formed in a flat plate shape. This base material tab 62' is arranged in a position sandwiched between a welding electrode 80 and the positive terminal 11 of the single cell 10 in the X axis direction. A copper electrode, a chrome electrode, or a tungsten electrode, for example, may be used for the welding electrode 80.

When the welding electrode 80 is moved in the −X axis direction and abutted against the base material tab 62', the base material tab 62' elastically deforms. When current is passed through the welding electrode 80 while the welding electrode 80 is abutting against the positive terminal 11 and the base material tab 62' that has elastically deformed as a result of the movement of the welding electrode 80, the metal will melt and the positive electrode tab 62 and the positive terminal 11 will be welded together. In this case, the positive electrode tab 62 is welded to the positive terminal 11 while there is tension pulling the single cell 10 in a direction away from the fuse 64 (i.e., in the +X axis direction). In this way, according to this example embodiment, the positive electrode tab 62 is able to be elastically deformed when welding using the welding electrode 80. As a result, the manufacturing process is able to be simplified and the cost is able to be reduced.

Next, the operation of one of the single cells 10 when the fuse 64 is disconnected (i.e., blown) will be described. When overcurrent flows through the single cell 10, the fuse 64 melts. However, the single cell 10 generates heat due to the overcurrent, so the insulating body 30 that retains the single cell 10 that has generated heat thermally melts or cracks. As a result, the retaining force with which the single cell 10 is retained by the insulating body 30 decreases. When the retaining force by the insulating body 30 decreases, the positive electrode tab 62 returns to a flat plate shape from a curved shape, so the single cell 10 separates from the fuse 64.

In this way, the structure of this example embodiment enables the negative terminal 12 of the single cell 10 to separate from the fuse 64 when the fuse 64 is disconnected (i.e., blown). Therefore, the negative terminal 12 is able to be inhibited from electrically reconnecting to the fuse 64. As a result, heat generation by the single cell 10 due to electrical reconnection is able to be suppressed, so heat damage to adjacent single cells 10 is able to be inhibited. Also, when the negative terminal 12 separates from the fuse 64, the elastic force of the positive electrode tab 62 is used. Therefore, independent driving means for moving the single cell 10 becomes unnecessary, so the structure is able to be simplified and the cost is able to be lower.

First Modified Example

In the second example embodiment, the single cells 10 are arranged on their sides. However, the single cells 10 may also be arranged vertically (i.e., standing). In this case, the single cell 10 is pulled away from the fuse 64 by both gravity and the elastic force of the positive electrode tab 62. As a result, the negative terminal 12 is able to be more reliably inhibited from electrically reconnecting to the fuse 64.

Modified Example 2

In the first and second example embodiments described above, the retaining force is reduced by the insulating body 30 that contacts the outer surface of the single cell 10 thermally melting or cracking. However, the invention is not limited to this. Other means for reducing the retaining force with which the single cell 10 is retained when the fuse 64 melts may also be used. The other means may be, for example, a method that involves electrically controlling the retaining force using a piezoelectric element, or a method that involves controlling the retaining force using an expansion vessel. The piezoelectric element functions to change the thickness according to the application of voltage. Therefore, for example, the retaining force by the insulating body 30 may be controlled by interposing a piezoelectric element between the insulating body 30 and the holder 20, and controlling the application of current to the piezoelectric element. Also, the retaining force with which the insulating body 30 retains the single cells 10 may also be controlled by interposing an expansion vessel between the insulating body 30 and the holder 20, and changing the volume of the expansion vessel.

What is claimed is:

1. A battery pack comprising:
   a single cell having a cylindrical shape, the single cell having a positive electrode at one end of the single cell and a negative electrode at the other end of the single cell, and a plurality of the single cells being arranged in a radial direction of the single cell;
   a fuse;
   a first bus bar connected via the fuse to one electrode, from among the positive electrode and the negative electrode;
   a second bus bar directly connected to the other electrode, from among the positive electrode and the negative electrode; and
   a retaining member configured to retain the plurality of single cells from the radial direction of the single cell, in a manner such that as a result of the fuse being disconnected, retaining force with which the single cell is retained by the retaining member decreases and the single cell moves in a direction away from the fuse.

2. The battery pack according to claim 1, wherein the single cell is arranged with the one electrode facing upward and the other electrode facing downward, and when the retaining force decreases, the single cell moves in the direction away from the fuse by falling due to gravitational force.

3. The battery pack according to claim 2, wherein the retaining member has a retaining surface that retains the single cell, the retaining surface is made of resin, and when the fuse is disconnected, the retaining surface thermally melts or cracks such that the retaining force decreases.

4. The battery pack according to claim 2, further comprising:
a gas release valve provided on the other electrode-side of the single cell, and the gas release valve being configured to release gas that is inside the single cell.

5. The battery pack according to claim 1, wherein the second bus bar elastically deforms and applies tension to the single cell such that the tension pulls the single cell in the direction away from the fuse.

6. The battery pack according to claim 5, further comprising:
a gas release valve provided on the positive electrode-side of the single cell, and the gas release valve being configured to release gas that is inside the single cell, wherein
the one electrode is the negative electrode and the other electrode is the positive electrode.

7. The battery pack according to claim 1, wherein the plurality of single cells are connected together in parallel.

8. A vehicle comprising:
a battery pack including,
a single cell having a cylindrical shape, the single cell having a positive electrode at one end of the single cell and a negative electrode at the other end of the single cell, and a plurality of the single cells being arranged in a radial direction of the single cell,
a fuse,
a first bus bar connected via the fuse to one electrode, from among the positive electrode and the negative electrode,
a second bus bar directly connected to the other electrode, from among the positive electrode and the negative electrode, and
a retaining member configured to retain the plurality of single cells from the radial direction of the single cell, in a manner such that as a result of the fuse being disconnected, retaining force with which the single cell is retained by the retaining member decreases and the single cell moves in a direction away from the fuse; and
a motor configured to travel a vehicle, the motor being driven using electric power stored in the battery pack.

* * * * *